May 3, 1927.
W. ERNI
1,627,022
STEERING MECHANISM FOR COASTER WAGONS
Filed Nov. 5, 1925
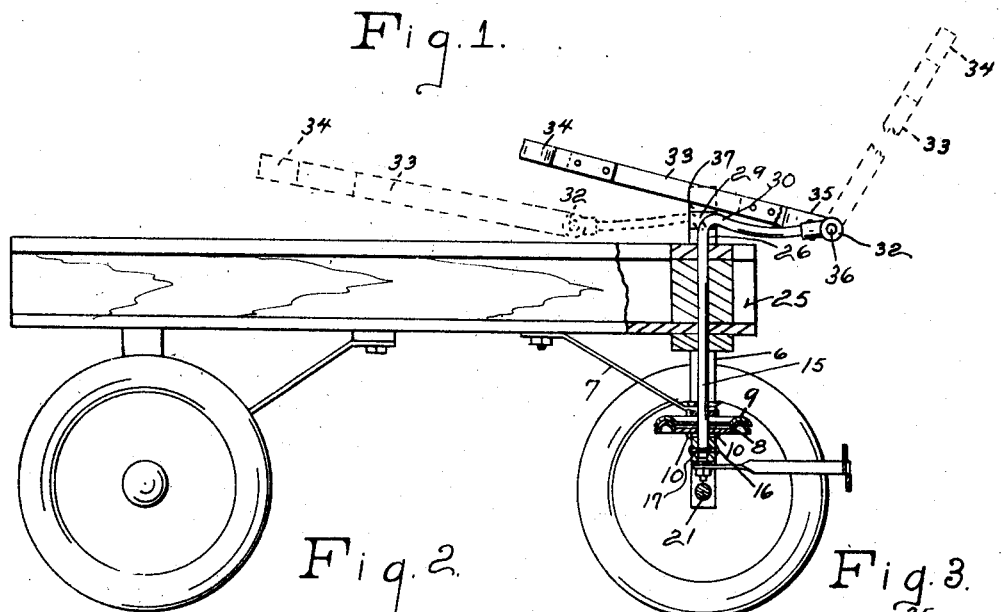
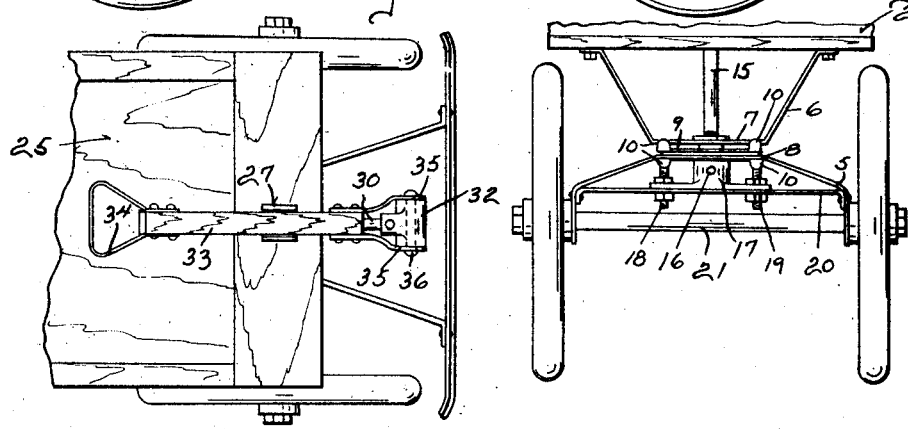
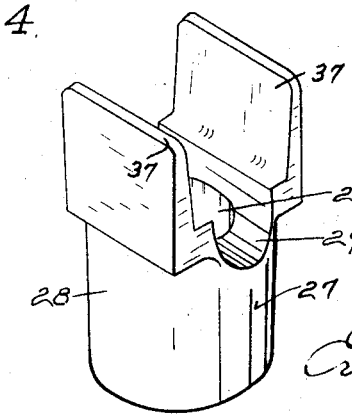
INVENTOR.
Walter Erni
BY
Erwin, Wheeler & Woolard
ATTORNEYS.

Patented May 3, 1927.

1,627,022

UNITED STATES PATENT OFFICE.

WALTER ERNI, OF MILWAUKEE, WISCONSIN.

STEERING MECHANISM FOR COASTER WAGONS.

Application filed November 5, 1925. Serial No. 66,948.

This invention relates to improvements in steering mechanism for coaster wagons. The present application is a companion to my application Number 729,902, dated August 4, 1924.

In common with my prior application above referred to it is my object to provide a device wherein a person propelling the wagon while kneeling therein can repose his weight upon the handle by which steering is effected. It is the particular object of the present invention to provide novel and improved structure whereby the handle under load is not only fulcrumed upon the king pin itself but has an additional fulcrum point well in advance of the king pin so that when the same handle is used for drawing the wagon a person pulling the wagon may walk at an increased distance in front of the wheels thereof.

It is a further object of the invention to provide a wagon steering device in which motion is transmitted from the handle through the king pin to a dirigible axle for steering purposes, the handle and the king pin being so designed as to provide a pivotal connection laterally offset from the axis of the king pin so that the distance of such connection from said axis may be added to or subtracted from the total length of the handle for the purpose of extending the handle to different parts of the wagon body for convenience of the operator.

In the drawings:—

Figure 1 is a view of a wagon embodying my invention and illustrated largely in side elevation, the steering mechanism, however, being in longitudinal vertical section.

Figure 2 is a plan view of the front portion of the wagon shown in Figure 1.

Figure 3 is a fragmental front elevation of said wagon.

Figure 4 is an enlarged detail in perspective of a fitting applied to the king bolt portion of the handle for the purposes of this invention.

Like parts are identified by the same reference characters throughout the several views.

In general the wagon herein disclosed is similar to that illustrated in the companion application above referred to. Bolsters 5 and 6 are applied to the axle and forward body portion of the wagon, respectively, bolster 6 being braced at 7. A fifth wheel comprising disks 8 and 9 is interposed between bolsters 5 and 6, the disks being secured to their respective bolsters by ears 10 and being provided with complementary annular channels as shown in Figure 1.

The king bolt 15 is passed through the brace 7 and the fifth wheel disks 9 and 8 and is connected by a cross pin 16 with an anchorage fitting 17 which is bolted at 18 and 19 to the horizontal tie member 20 of bolster 5. The fitting 17 thus serves conveniently to provide an operative and strong connection between the king bolt and the dirigible axle 21 of the wagon.

In my companion application the king bolt was formed integrally with the entire handle of the wagon. In the present case the king bolt is formed integrally with a part of the handle.

The wagon box or body is designated in its entirety by reference character 25. It is provided at its forward end with a bearing as shown in Figure 1 for the upwardly extended king bolt 15. Above this bearing the king bolt passes through the central aperture 26 of a special handle rest designated in its entirety by reference character 27. The opening 26 through which the handle is received is formed in a sleeve like portion 28 of the handle rest having in its upper end a transverse channel 29. The king bolt has a portion 30 which is bent forwardly in channel 29 and therebeyond. Well in advance of the wagon body the forwardly extending arm 30 terminates in a bearing head 32. A handle proper 33 has a grip portion 34 at one end and spaced arms 35 at its other end. Arms 35 receive a pivot bolt 36 which passes through the bearing head 32. Handle 33 may be oscillated about pivot pin 36 to the various positions indicated in full and dotted lines in Figure 1. In the full line position of the handle it is illustrated as reposing in a saddle formed by upwardly extending flanges 37 on the handle seat 27.

In this position of the handle it is well adapted to support the weight of a child kneeling in the wagon in a position to propel the wagon through the use of one foot on the side thereof. The pivotal connection 36 of the handle 33 with king bolt 15 is well forward and consequently the major portion of the wagon box is left unobstructed. At the same time the saddle or supporting member 27 which is adapted to receive weight imposed on the handle is fulcrumed on the king pin itself for movement coaxially therewith, whereby obviating the necessity of providing a separate device for this purpose.

When it is desired to draw the wagon the handle 33 will be pivoted forwardly to a position somewhat as indicated in dotted lines at the right hand side of Figure 1. The forward location of pivot 36 insures that the person drawing the wagon will be sufficiently in advance thereof so that the wheels of the wagon will not be too close to his heels.

When the wagon is being used for coasting the radial extent of arm 30 is used to good advantage in bringing the handle in convenient proximity to the rear of the wagon. A person sitting in the wagon for coasting purposes will require the handle in a very different position from that in which the handle is shown in full lines for convenience in wagon propulsion. A person using the wagon for coasting will ordinarily sit at the rear of the box and in order to bring the handle conveniently to him it is only necessary to rotate the king pin 180° whereupon the arm 30 of the king pin will project rearwardly and its length will be added to the length of the handle proper 33 instead of being subtracted therefrom as in the full line positions of the parts.

I claim:

1. In a device of the character described, the combination with a wagon body and a dirigible axle operatively arranged for the support thereof, of a king pin connected with said axle and extending upwardly above said body, a laterally projecting arm connected with said king pin for rotation therewith and adapted alternatively to project forwardly or rearwardly thereof in the different positions of said pin, and a handle fulcrumed to said arm and movable about its fulcrum to various positions wherein its projection from the axis of said king pin may be the sum or the difference of the lengths of said handle and said arm, together with a saddle having an aperture to receive said king pin and positioned above said wagon body to provide a support adapted to receive an intermediate portion of said handle in one position thereof.

2. The combination with a wagon body and a dirigible axle in operative supporting relation thereto, of a king pin connected with said axle and extending upwardly through said body, a saddle applied to said king pin above said body, an arm comprising a lateral extension of said king pin and projecting from said saddle in splined connection therewith, and a handle pivoted to said arm remote from the axis of said king pin and provided with an intermediate portion receivable in said saddle.

3. The combination with a wagon body and a dirigible axle in operative supporting relation thereto, of a steering shaft operatively connected with said axle and projecting above a forward portion of said body, a normally forwardly extending arm on said shaft, a saddle applied to said shaft and projecting upwardly above said arm, and a handle in pivotal connection with said arm and receivable in said saddle, said saddle being apertured to receive said shaft and provided with a channel engaged with said arm.

4. The combination with a steering shaft bent to provide a forwardly extending arm, of a saddle apertured to receive said shaft and provided with a channel opening to said aperture and engaging said arm, said saddle having upwardly projecting members in laterally spaced relation and adapted to receive a handle connected with said arm.

WALTER ERNI.